United States Patent
Chang et al.

(10) Patent No.: US 9,645,723 B2
(45) Date of Patent: May 9, 2017

(54) ROW AND COLUMN NAVIGATION

(75) Inventors: Ming-Hsiung Chang, New Taipei (TW); Shao-Yi Hung, Taipei (TW); Li-Hui Chen, Taipei (TW); Peng-Jen Chen, New Taipei (TW); Hsin Hui Huang, Taipei (TW); Hung-Ju King, New Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 13/481,967

(22) Filed: May 29, 2012

(65) Prior Publication Data

US 2013/0321282 A1 Dec. 5, 2013

(51) Int. Cl.
*G06F 3/041* (2006.01)
*G06F 3/0485* (2013.01)
*G06F 3/0488* (2013.01)
*G06F 17/24* (2006.01)

(52) U.S. Cl.
CPC ........ *G06F 3/0485* (2013.01); *G06F 3/04883* (2013.01); *G06F 17/246* (2013.01)

(58) Field of Classification Search
CPC ...................................... G06F 3/041
USPC ...................................... 345/173
See application file for complete search history.

(56) References Cited

U.S. PATENT DOCUMENTS

| | | | |
|---|---|---|---|
| 7,299,406 B2 | 11/2007 | Schnurr | |
| 7,552,142 B2 | 6/2009 | Lee et al. | |
| 2003/0156137 A1* | 8/2003 | Von Essen | G06F 3/0481 715/771 |
| 2009/0070704 A1 | 3/2009 | Ording | |
| 2009/0313537 A1 | 12/2009 | Fu et al. | |
| 2010/0257439 A1 | 10/2010 | Xue et al. | |
| 2010/0275150 A1* | 10/2010 | Chiba | G06F 3/0488 715/784 |
| 2012/0013539 A1* | 1/2012 | Hogan | G06F 3/04883 345/173 |

(Continued)

OTHER PUBLICATIONS

"How to use Excel Mobile on touch screen devices", Retrieved at <<http://www.smartphonemag.com/cms/node/473>>, Feb. 23, 2007, pp. 4.

(Continued)

*Primary Examiner* — Jennifer Mehmood
*Assistant Examiner* — Carl Adams
(74) *Attorney, Agent, or Firm* — Lee & Hayes, PLLC

(57) ABSTRACT

Concepts and technologies are described herein for row and column navigation. In accordance with the concepts and technologies disclosed herein, a user device executes an application program configured to present data in a user interface ("UI"). The user device can execute a navigation controller to detect touch events at the user device. The navigation controller can determine if touch events correspond to input for panning or scrolling the UIs and for implementing the requested panning or scrolling. The navigation controller can include functionality for providing a touch event handler to detect input for panning or scrolling the data and a UI scrolling manager that implements the requested panning or scrolling. The panning or scrolling can be tracked and the data, as modified in accordance with the tracked movement, can be presented to a user in a UI.

16 Claims, 10 Drawing Sheets

(56) References Cited

U.S. PATENT DOCUMENTS

2012/0327009 A1* 12/2012 Fleizach ............ G06F 3/04883
  345/173

OTHER PUBLICATIONS

"Microsoft Office 2010 Engineering", Retrieved at <<http://blogs.technet.com/b/office2010/archive/2010/03/31/make-informed-decisions-on-the-go-with-excel-mobile-2010.aspx>>, Mar. 31, 2010, pp. 18.

Hinckley, et al., "Sensing Techniques for Mobile Interaction", Retrieved at <<http://icie.cs.byu.edu/cs656/Papers/3D-physical/Sensing-p91-hinckley.pdf>>, Proceedings of the 13th annual ACM symposium on User interface software and technology, Aug. 27, 2004, p. 91-100.

Hollington, Jesse, "iPhone + iPad Gems: Quickoffice / Pro / HD, Documents to Go, Office2 + HD", Retrieved at <<http://www.ilounge.com/index.php/articles/comments/iphone-ipad-gems-quickoffice-pro-hd-documents-to-go-office2-hd/>>, Sep. 9, 2011, pp. 19.

* cited by examiner

ROW AND COLUMN NAVIGATION

BACKGROUND

Spreadsheets have become a popular file format for storing, manipulating, and/or sharing various types of data. Spreadsheets can be used to present data in a table-based or grid-based layout. The spreadsheets can include any number of cells or fields arranged into columns and rows.

Traditionally, users have installed spreadsheet programs for native execution on a computer or other user device. These spreadsheet programs can be optimized for a particular computing platform such as a desktop or laptop computer, a slate or tablet computer, smart phone, or the like. Additionally, these spreadsheet programs can be optimized for specific anticipated input mechanisms such as mice, keyboard commands, or the like.

Users also may interact with world wide web ("web") based spreadsheet applications. In a web-based spreadsheet application, workbook and/or spreadsheet files can be represented by hypertext markup language ("HTML") code, extensible markup language ("XML") code, and/or code in other formats. Various scripts or other types of code can be used to implement user manipulation of the spreadsheet files. Web-based spreadsheet applications can allow users to create, save, edit, and/or access spreadsheet files across various platforms and/or locations.

One limitation of web-based spreadsheet applications, however, is the inability to scroll or pan the spreadsheet data in two dimensions simultaneously. Rather, users generally must implement scroll commands only in single dimensions such as horizontally or vertically. This limitation reduces the speed with which users can navigate across or through spreadsheets and therefore poses a challenge to providing an ideal user experience.

It is with respect to these and other considerations that the disclosure made herein is presented.

SUMMARY

Concepts and technologies are described herein for row and column navigation. In accordance with the concepts and technologies disclosed herein, a user device executes application programs such as a web browser. The web browser can be configured to render and present data corresponding to a spreadsheet in a UI. In some embodiments, the data is stored at the user device and in some other embodiments, the data is obtained from a server computer that hosts or serves the data. The data can be presented in a user interface ("UI").

The user device also can be configured to execute a navigation controller. The navigation controller can be configured to detect touch events at the user device, to determine if the touch events correspond to input for requesting movement such as panning or scrolling within the UIs, and for implementing the requested movements. According to some implementations, a touch event handler can be configured to detect input for panning or scrolling the data shown in the UIs and a UI scrolling manager for implementing the requested panning or scrolling. In some embodiments, the panning or scrolling can be implemented by determining an x, horizontal, or column component of the input and a y, vertical, or row component of the input. The navigation controller can update the data, for example by modifying <div> tags or other tags or code associated with the data and rendering the modified data for presentation in a UI.

According to one aspect, the navigation controller determines a movement vector between an initial contact point ("contact point") at which the pan or scroll gesture is initiated and a last contact point ("release point") at which the pan or scroll gesture is completed or terminated. A column movement component and a row movement component of the movement vector can be determined and used to update the data. In some embodiments, use of a movement vector allows net movements to be tracked and implemented instead of merely implementing all tracked movements. As such, some embodiments of the concepts and technologies disclosed herein allow movements in opposite directions to cancel one another out, thereby enabling the navigation controller to determine a net movement that can be used to provide a smooth and efficient modification of the UI.

According to another aspect, the column movement component and the row movement component can be applied to the data to implement the input. The modified data can be rendered by the application programs and again presented in a UI. As such, embodiments of the concepts and technologies disclosed herein can support horizontal movements, vertical movements, and/or diagonal movements through or within spreadsheets, including spreadsheets generated by web-based spreadsheet applications.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
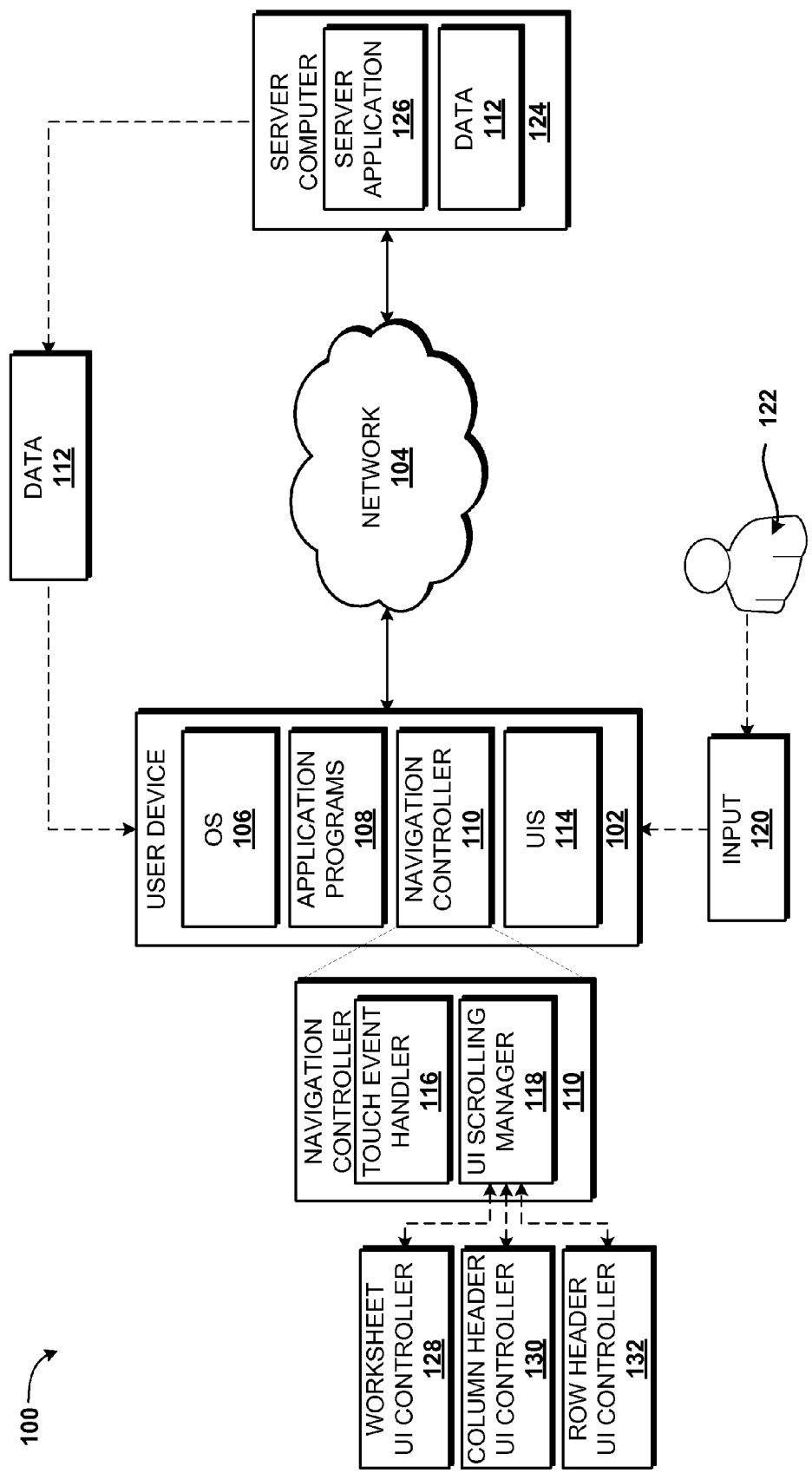
FIG. 1 is a system diagram illustrating an illustrative operating environment for the various embodiments disclosed herein.

The following detailed description is directed to concepts and technologies for row and column navigation. According to the concepts and technologies described herein, a user device executes one or more application programs such as a web browser. The web browser can be configured to render and present data in a user interface ("UI"). In some embodiments, the data rendered in the UI can correspond to a spreadsheet. The data can be stored at the user device or can be obtained from a remote data storage device such as a datastore, a hard drive, a server computer, or other device.

The user device also can be configured to execute a navigation controller configured to detect touch events at the user device. The navigation controller also can be configured to determine if touch events correspond to input for requesting movement such as panning or scrolling within the UIs and for implementing the requested movements. According to some implementations, the navigation controller can include functionality for providing a touch event handler configured to detect input for panning or scrolling the data shown in the UIs. The navigation controller also can be configured to include functionality for providing a UI scrolling manager that implements the requested panning or scrolling. The panning or scrolling can be tracked and represented by a vector, and the navigation controller can determine a column component of the tracked movement and row component of the tracked movement. The navigation controller can update the data display in accordance with the tracked movement and the data, as modified in accordance with the tracked movement, can be presented to a user in a UI.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for row and column navigation will be presented.

Referring now to FIG. 1, aspects of one operating environment 100 for the various embodiments presented herein will be described. The operating environment 100 shown in FIG. 1 includes a user device 102. According to various embodiments, the functionality of the user device 102 can be provided by a personal computer ("PC") such as a desktop, tablet, or laptop computer system. In some other embodiments, the functionality of the user device 102 can be provided by other types of computing systems including, but not limited to, a handheld computer, a netbook computer, an embedded computer system, a personal digital assistant ("PDA"), a mobile telephone, a smart phone, or another computing device.

Various embodiments of the user device 102 are illustrated and described below, particularly with reference to FIGS. 4-6. According to various embodiments of the concepts and technologies disclosed herein for row and column navigation, the functionality of the user device 102 is described as being provided by a tablet or slate computing device, a smartphone, or a PC having a touch-sensitive display. Because the functionality described herein with respect to the user device 102 can be provided by additional and/or alternative devices, it should be understood that these embodiments are illustrative, and should not be construed as being limiting in any way.

The user device 102 can be configured to execute an operating system 106, one or more application programs 108, and a navigation controller 110. The operating system 106 is a computer program for controlling the operation of the user device 102. The application programs 108 and the navigation controller 110 are executable programs configured to execute on top of the operating system 106 to provide various functions. According to various implementations, the application programs 108 include, but are not limited to, web browsing programs, multimedia software, native web-based applications, other applications, or the like. The application programs 108 can be configured to receive or store data 112, to execute various operations with respect to the data 112, and to render various views of the data 112 in one or more user interfaces ("UIs") 114.

The navigation controller 110 can be configured to provide the functionality described herein for navigating rows and columns. In particular, the navigation controller 110 can be configured to detect and implement interactions with the UIs 114. In some embodiments, the navigation controller 110 is configured to communicate with the application programs 108 to provide the functionality described herein. As shown in FIG. 1, the navigation controller 110 can include various modules and/or operations for providing a touch event handler 116 and a UI scrolling manager 118 for modifying the UIs 114 based upon input 120 received from a user or other entity ("user") 122. While the touch event handler 116 and the UI scrolling manager 118 are illustrated as separate entities or modules of the navigation controller 110, it should be understood that the functionality described herein with respect to the navigation controller 110, the touch event handler 116, and the UI scrolling manager 118 can be provided by a single module or application. The functionality of the navigation controller 110, the touch event handler 116, and the UI scrolling manager 118 are described in more detail below.

In one contemplated embodiment, the data 112 corresponds to spreadsheet data or data in other grid-based or tabular formats. The data 112 can be stored at the user device 102 in a memory or other data storage device associated with the user device 102. In other embodiments, the data 112 is obtained from a data source such as a database, a network storage device, or another data storage device such as a server computer 124 that is operating as part of, or in communication with, the network 104. Because the data 112 can be obtained from almost any source, it should be understood that the illustrated embodiment in which the data 112 is obtained from the server computer 124 is illustrative and should not be construed as being limiting in any way.

The server computer 124 can be configured to execute a server application 126 for hosting and/or serving the data 112 to the user device 102 and/or other devices, nodes, and/or networks. According to various embodiments, the data 112 corresponds to a spreadsheet generated and/or readable by a member of the MICROSOFT EXCEL family of products from Microsoft Corporation in Redmond, Wash. In other embodiments, the data 112 corresponds to a HTML file, an XML file, other types of files, and/or various scripts such as, for example, JAVASCRIPT, and/or other web-based file formats or executable code that, when executed and/or rendered by the application programs 108, represent various files. According to some implementations, the files represented by the data 112 can include, but are not limited to, a file in a web-based format for representing spreadsheets, workbooks, tables, grids, or other types of files. Because the data 112 can include data in the above-described, as well as other formats, it should be understood that the above embodiments are illustrative, and should not be construed as being limiting in any way.

The UIs 114 can include, in various embodiments, computer-executable code that, when executed by the user device 102, causes the user device 102 to present a user interface for viewing the data 112, for supporting interactions by the user 122 with the data 112, to allow the user 122 to interact with the application programs 108 executed by the user device 102, and/or to support viewing and/or otherwise interacting with the data 112. Various embodiments of the UIs 114 are illustrated and described below with reference to FIGS. 3A-3E. Briefly, the UIs 114 can include various application-specific and/or device-specific menus, soft buttons, and/or other types of controls for controlling the application programs 108, for interacting with the data 112, and/or for interacting with or controlling other applications or resources associated with and/or accessed by the user device 102.

According to some embodiments in which the data 112 corresponds to a spreadsheet or workbook file, the UIs 114 also can display worksheet data, a column header, a row header, and/or other worksheet and/or spreadsheet elements. These and/or other elements of the UIs 114 can be configured as container elements wrapping actual content corresponding to the displayed elements. For example, as generally is understood, a table or spreadsheet can be generated in HTML or XML using one or more HTML <div> tags to create sections, rows, columns, or other table or spreadsheet elements. Furthermore, containers can be used to constrain an area of a display screen or display space on which the rendered data 112 is to be displayed, and can hide data that exceeds the containers. Because generation of a spreadsheet and/or table in HTML is generally understood, the data 112 is not described in additional detail herein.

The navigation controller 110 can be configured to modify the UIs 114 based upon input 120 received at the user device 102. As will be explained in more detail herein, the input 120 received from the user device 102 can be interpreted by the server application 126 as a movement command for panning, moving, scrolling, and/or otherwise modifying a view of the data 112 in one or more of the UIs 114. In particular, the navigation controller 110 can include functionality corresponding to a touch event handler 116 for registering touch events at a touch-sensitive and/or multi-touch-sensitive display or other input device associated with the user device 102. Thus, the user device 102 can be configured, via execution of the navigation controller and/or the touch event handler 116 to detect contact between the user 122 and the user device 102.

The navigation controller 110 also can include functionality corresponding to the UI scrolling manager 118 mentioned above. The UI scrolling manager 118 can be triggered by the touch event handler 116 and/or the navigation controller 110 when a touch event is detected at the user device 102. Thus, the UI scrolling manager 118 can be configured to determine, based upon a touch event registered by the touch event handler 116, how to manipulate the UIs 114 based upon the input 120. While not separately illustrated in FIG. 1, the UI scrolling manager 118 can invoke processes or modules corresponding to a worksheet UI controller 128, a column header UI controller 130, and/or a row header UI controller 132 to update UI content and/or positions of the UI content in response to the input 120 detected and tracked by the navigation controller 110. Thus, upon registering a touch event, the navigation controller 110 can be configured to track the event, to determine a command intended by a movement associated with the touch event, and to implement the command by updating a column header, a row header, and/or UI contents based upon the command. These and other aspects of the concepts and technologies disclosed herein for row and column navigation are described in additional detail below, particularly with reference to FIGS. 2-3E.

According to various embodiments, a user device 102 opens or accesses data such as the data 112. The data 112 can correspond, in various embodiments, to a spreadsheet file and/or to data such as HTML or XML code that represents a spreadsheet file. The data 112 can be rendered by a web browser or other computer executable code such as the application programs 108. The rendered data 112 can be presented in a user interface such as one or more of the UIs 114.

The user device 102 also can execute the navigation controller 110, which can include the functionality described herein with respect to the touch event handler 116 and/or the UI scrolling manager 118 to monitor interactions with the UIs 114. If a touch event is registered by the navigation controller 110, the navigation controller 110 can determine if the touch event corresponds to the input 120, which can correspond to a movement input such as a pan or touch-drag gesture for navigating rows and columns of the spreadsheet. If the user device 102 determines that the touch event corresponds to the input 120, the navigation controller 110 can provide the functionality described herein with respect to the UI scrolling manager 118 to interpret the input 120 and to apply the movement requested by way of the input 120 to the UIs 114.

According to various embodiments, the navigation controller 110 interprets the input 120 by determining an x, horizontal, or column component of the input 120 and by determining a y, vertical, or row component of the input 120. The user device can modify a <div> tag or other tag associated with the displayed data 112 to modify the UIs 114. After the changes are made to the UIs 114, the navigation controller 110 can issue a command to the application programs 108 to again render the data 112 in accordance with the modified code. As such, the navigation controller 110 can be used to update the UIs 114 to implement diagonal movements with respect to spreadsheets, table data, and/or grid-based data. These and other aspects of the concepts and technologies disclosed herein are described in more detail below, particularly with reference to FIGS. 2-3E.

FIG. 1 illustrates one user device 102, one network 104, and one server computer 124. It should be understood, however, that some implementations of the operating environment 100 include multiple user devices 102, multiple networks 104, and/or multiple server computers 124. Thus, the illustrated embodiment should be understood as being illustrative, and should not be construed as being limiting in any way.

Figure 2:
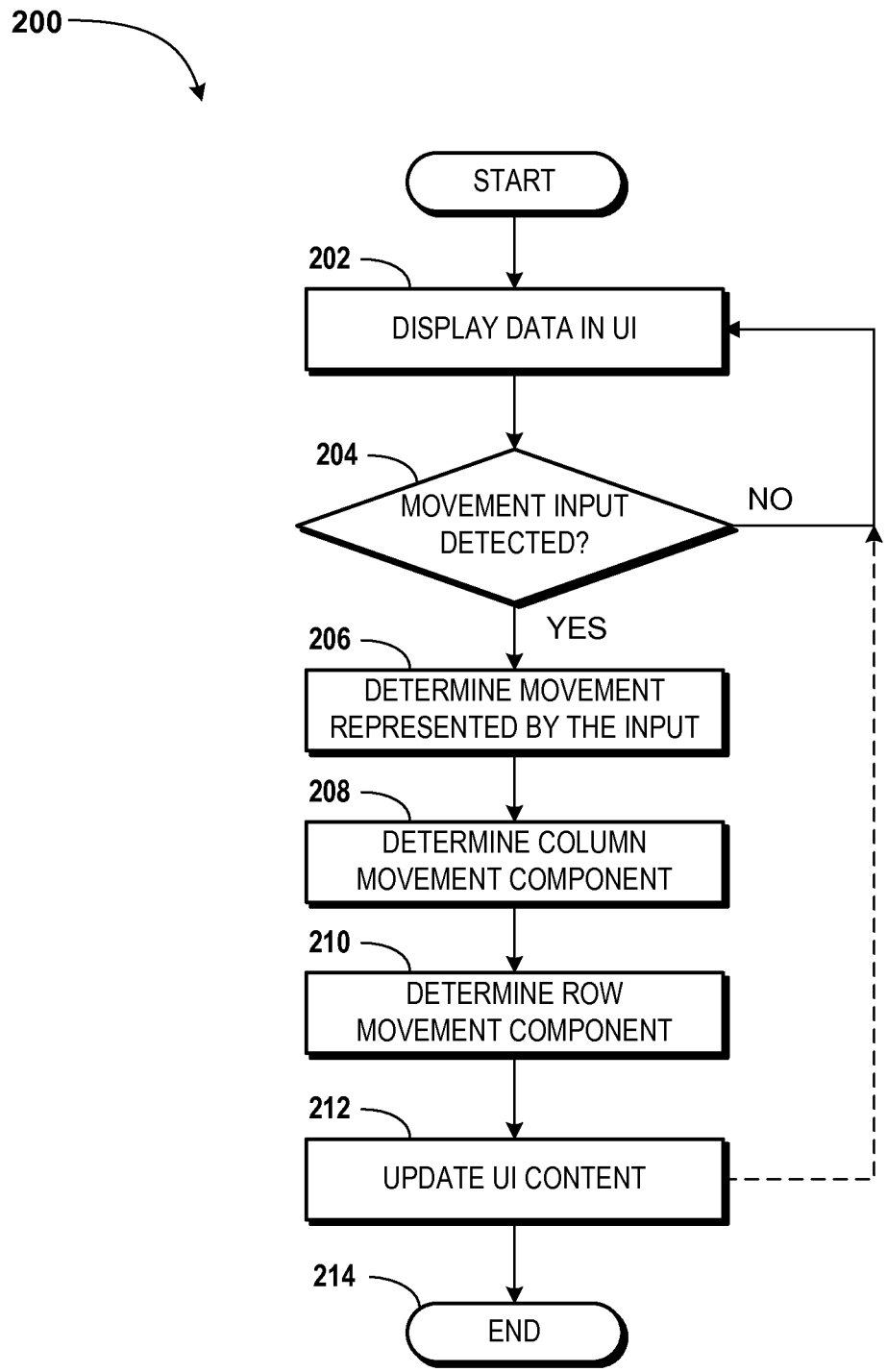
FIG. 2 is a flow diagram showing aspects of a method for row and column navigation, according to an illustrative embodiment.

Turning now to FIG. 2, aspects of a method 200 for row and column navigation will be described in detail. It should be understood that the operations of the method 200 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein can be implemented as a sequence of computer implemented acts or program modules running on a computing system, and/or as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 disclosed herein is described as being performed by the user device 102 via execution of computer executable instructions such as, for example, the application programs 108 and the navigation controller 110. As explained above, the navigation controller 110 can include functionality for providing a touch event handler 116 and/or a UI scrolling manager 118. As such, while the method 200 is described as being provided by the user device 102, it should be understood that the user device 102 can provide the functionality described herein via execution of various application program modules and/or elements. Additionally, devices other than, or in addition to, the user device 102 can be configured to provide the functionality described herein via execution of computer executable instructions other than, or in addition to, the navigation controller 110, the touch event handler 116, and/or the UI scrolling manager 118. As such, it should be understood that the described embodiment is illustrative, and should not be construed as being limiting in any way.

Figure 3A:
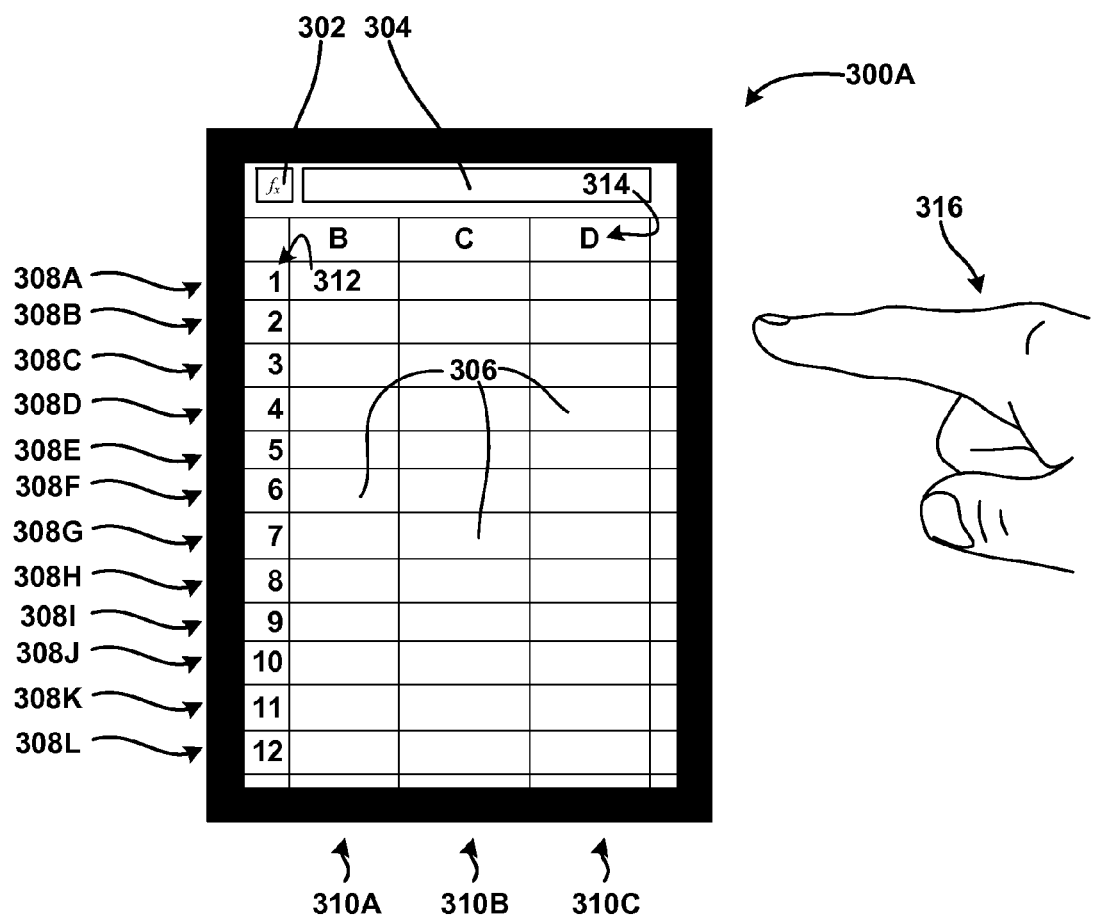
FIGS. 3A-3E are user interface diagrams showing aspects of user interfaces for enabling row and column navigation, according to various illustrative embodiments.

The method 200 begins at operation 202, wherein the user device 102 displays data such as the data 112 in a user interface such as the UIs 114. Although not shown in FIG. 2, the data 112 displayed in operation 202 can be obtained from a remote data storage device such as the server computer 124, a network hard drive, a database, a datastore, or other real or virtual data sources. Additionally, or alternatively, the data 112 can be stored at the user device 102. As explained above, the data 112 can correspond to a spreadsheet. An example of the data 112 in which the data 112 corresponds to a spreadsheet is illustrated in FIG. 3A. Because the data 112 can include other types of data and/or other data formats, it should be understood that this embodiment is illustrative, and should not be construed as being limiting in any way.

From operation 202, the method 200 proceeds to operation 204, wherein the user device 102 determines if movement input such as the input 120 is detected at the user device 102. The phrase "movement input" can be used herein to refer to a touch-drag gesture detected at the user device 102. More particularly, the touch event handler 116 can be configured to detect touch events of various types such as tap gestures, tap-and-hold gestures, pinch gestures, double tap gestures, or the like. While the touch event handler 116 can be configured to recognize these and other events, the movement input mentioned in operation 204 can correspond to a touch-drag gesture or other touch-drag input.

Thus, while various commands can be indicated by various types of touch gestures, operation 204 can correspond to the user device 102 determining if a touch-drag gesture has been detected at the user device 102. As such, operation 204 can include determining not only if a touch event has been registered by the touch event handler 116, but also if a movement of a stylus, hand, or other input device or structure has been detected subsequent to an initial contact associated with the touch event. The touch-drag gesture is illustrated schematically below with reference to FIGS. 3B-3C.

If the user device 102 determines, in operation 204, that a movement input such as the input 120 has not been detected, the method 200 can return to operation 204 and the user device 102 can again determine if a movement input has been detected. As such, execution of the method 200 can, but does not necessarily, repeat or pause at operation 204 until a movement input such as the input 120 is detected at the user device 102. If the user device 102 determines, in operation 204, that a movement input has been detected, the method 200 can proceed to operation 206.

At operation 206, the user device 102 can determine a movement represented by the movement input, for example the input 120, detected in operation 204. In some embodiments, the touch event handler 116 can be configured to trigger the UI scrolling manager 118 when the input 120 is detected. The UI scrolling manager 118 can be configured to invoke or execute functionality associated with a worksheet UI controller 128, a column header UI controller 130, and/or a row header UI controller 132 to update the UI content and/or the positioning of elements displayed in the UIs 114. The UI scrolling manager can inform the worksheet UI controller 128, the column header UI controller 130, and/or the row header UI controller 132 to update the content and positions to reflect the adjustment associated with the detected input 120.

According to various implementations, operation 206 includes determining a distance of movement and/or a direction of movement associated with the movement input detected in operation 204. In some embodiments, the user device 102 is configured to determine a vector between an initial contact point and a release point of a touch-drag gesture. An example of determining a vector between a contact point and a release point is schematically illustrated and described with reference to FIG. 3D below.

From operation 206, the method 200 proceeds to operation 208, wherein the user device 102 determines a column movement component of the movement determined in operation 206. As such, if a vector corresponds, for example, to a movement across one column of a spreadsheet, the user device 102 can determine that the column movement component of the movement input corresponds to a single column. In some embodiments, the user device 102 is configured to round up or round down to a nearest column, and in other embodiments, the user device is configured to support movement across portions of columns. As such, the user device 102 can be configured to determine a horizontal and/or column component of the movement input detected in operation associated with the movement tracked in operation 206.

From operation 208, the method 200 proceeds to operation 210, wherein the user device 102 determines a row movement of the movement determined in operation 206. As such, if a vector corresponds, for example, to a movement across two rows of a spreadsheet, the user device 102 can determine that the row movement component of the movement input corresponds to two rows. In some embodiments, the user device 102 is configured to round up or round down to a nearest row, and in other embodiments, the user device is configured to support movement across portions of rows. As such, the user device 102 can be configured to determine a vertical and/or row component of the movement input detected in operation associated with the movement tracked in operation 206.

From operation 210, the method 200 proceeds to operation 212, wherein the user device 102 can update contents of the UIs 114. In particular, the user device 102 can be configured to update the UIs 114 to reflect the column movement component determined in operation 208 and the row movement component determined in operation 210. In some embodiments, the user device 102 is configured to update the contents of the UIs 114 by moving a <div> tag associated with the column headers according to the determined column movement component and by moving a <div> tag associated with the row headers according to the determined row movement component. Furthermore, the user device 102 can be configured to update the contents or actual data values to reflect the newly displayed content. An example of updating contents of the UIs 114 is illustrated and described in more detail below with reference to FIGS. 3A-3E.

From operation 212, the method 200 can proceed to operation 214. The method 200 ends at operation 214. In some other embodiments, the method 200 can return to operation 202 from operation 212. As such, the method 200 can end after operation 212 or the method 200 can be repeated any number of times.

Turning now to FIGS. 3A-3E, UI diagrams showing various aspects of the concepts and technologies disclosed herein for row and column navigation will be described according to various illustrative embodiments. In particular, FIG. 3A shows an illustrative screen display 300A generated by a device such as the user device 102. In some embodiments, the screen display 300A corresponds to one or more of the UIs 114 shown in FIG. 1 and described above with reference to FIGS. 1-2. It should be appreciated that the UI diagram illustrated in FIG. 3A is illustrative of one contemplated embodiment, and therefore should not be construed as being limited in any way.

As shown in FIG. 3A, the screen display 300A can include a representation of a spreadsheet. In the illustrated embodiment, the screen display 300A includes a representation of a spreadsheet generated by a member of the MICROSOFT EXCEL family of spreadsheet programs from Microsoft Corporation in Redmond, Wash. In particular, the screen display 300A is illustrated as including a representation of a spreadsheet included in the data 112 generated by the server application 126, wherein the server application 126 can correspond to a web-based MICROSOFT EXCEL application for creating, editing, saving, and/or viewing spreadsheet files. It should be understood that this embodiment is illustrative, and should not be construed as being limiting in any way.

As shown in FIG. 3A, the screen display 300A can include a UI control 302 for accessing a list of functions and a text field 304 for entering or editing functions or other values for a selected cell 306 in the spreadsheet. The screen display 300A also can include rows 308A-L (hereinafter collectively and/or generically referred to as "rows 308") and columns 310A-C ("hereinafter collectively and/or generically referred to as "columns 310"). As is generally understood, the rows 308 can include a row headers 312, which can provide a label, category, or other data associated with the rows 308, and column headers 314, which can provide a label, category, or other data associated with the columns 310.

In the illustrated embodiment, the screen display 300A can be presented on a touch-sensitive and/or multi-touch-sensitive display associated with a device such as the user device 102. For purposes of illustration, and not limitation, a user's hand 316 is illustrated proximate to the screen display 300A as if about to initiate an interaction with the screen display 300A. Because other input devices or structures can be used in accordance with the concepts and technologies disclosed herein, it should be understood that this embodiment is illustrative, and should not be construed as being limiting in any way.

As explained above, the row headers, column headers, and contents of the cells/elements can be defined by HTML, XML, or web-based code or formats. In some embodiments, HTML <div> tags can be used to define the columns, the rows, and/or the cells. In FIG. 3A, a <div> tag can define each of the columns B-D corresponding to the columns 310A-C, and rows 1-12 corresponding to the rows 308A-L. Because other tags and/or languages can be used to format the data 112, it should be understood that this embodiment is illustrative, and should not be construed as being limiting in any way.

Figure 3B:
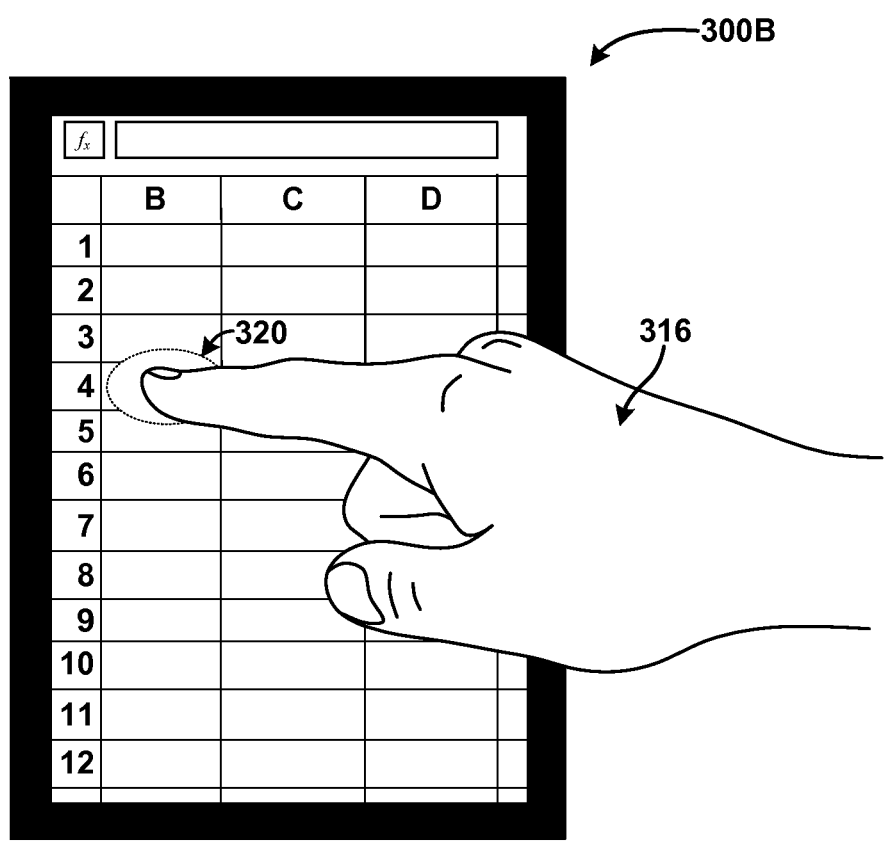

Referring now to FIG. 3B, a UI diagram showing additional aspects of the concepts and technologies disclosed herein for row and column navigation is described in detail. In particular, FIG. 3B shows a screen display 300B generated by a device such as the user device 102. In some embodiments, the screen display 300B corresponds to one or more of the UIs 114 shown in FIG. 1 and described above with reference to FIGS. 1-3A. It should be appreciated that the UI diagram illustrated in FIG. 3B is illustrative of one contemplated embodiment, and therefore should not be construed as being limiting in any way. In FIG. 3B, the user's hand 316 is illustrated as being brought into contact with the screen or display used to present the screen display 300B. In particular, the user's hand 316 is illustrated as engaging a contact point or points ("contact point") 320 on the screen or display. Of course, the illustrated contact point 320 is purely illustrative and should not be construed as being limiting in any way.

As described above in detail with reference to FIG. 2, the user device 102 or other device configured to present the screen display 300B can be configured to execute a navigation controller 110, which can include functionality such as that described above with regard to the touch event handler 116. As such, the user device 102 can register a touch event when the user's hand 316 or other device or entity is brought into contact with the screen or display used to present the screen display 300B. As explained above with reference to operation 204 of FIG. 2, the user device 102 or other device configured to present the screen display 300B can be configured to track movement of the user's hand 316 or other device or entity to interpret the input 120 associated with the touch event. As such, the user device 102 can be configured to take various actions in response to the touch event including, but not limited to, executing a select command to select a cell corresponding to the contact point 320, to begin executing a scroll command, to begin executing a pan command, to begin executing a zoom command, and/or to begin monitoring movement of the contact point 320 to provide the functionality described herein for row and column navigation. Because the user device 102 can be configured to execute other commands upon registering a touch event, it should be understood that these embodiments are illustrative, and should not be construed as being limiting in any way.

Figure 3C:
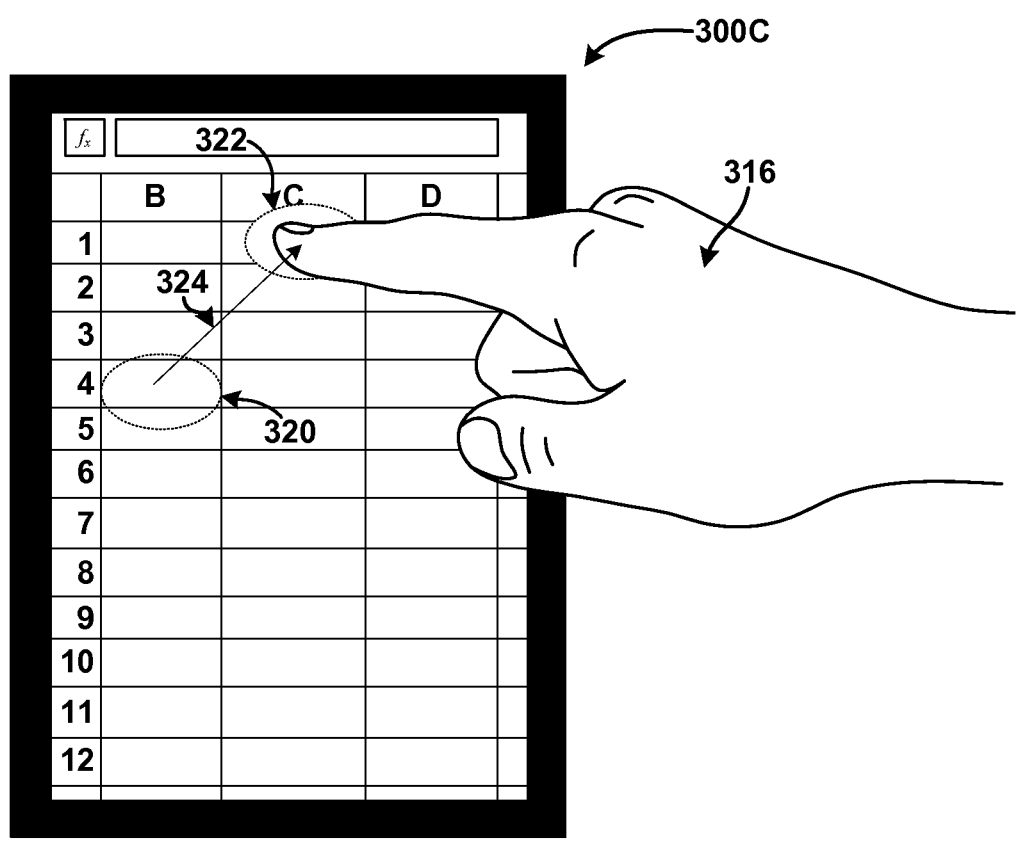

Referring now to FIG. 3C, a UI diagram showing additional aspects of the concepts and technologies disclosed herein for row and column navigation is described in detail. In particular, FIG. 3C shows a screen display 300C generated by a device such as the user device 102. In some embodiments, the screen display 300C corresponds to one or more of the UIs 114 shown in FIG. 1 and described above with reference to FIGS. 1-3B. It should be appreciated that the UI diagram illustrated in FIG. 3C is illustrative of one contemplated embodiment, and therefore should not be construed as being limited in any way. In FIG. 3C, the user's hand 316 is illustrated as having been moved from the contact point 320 shown in FIG. 3B to a release point 322. The release point 322 shown in FIG. 3C can correspond to a point or points on the screen or display used to present the screen display 300C at which movement of the user's hand 316 terminates and at which the user's hand 316 is removed from contact with the screen or display used to present the screen display 300C. It should be understood that the illustrated release point 322 is illustrative and should not be construed as being limiting in any way.

As can be appreciated by collectively referring to FIGS. 3B and 3C, the movement of the user's hand 316 captured in these FIGURES can correspond to a navigation command, described above as the input 120. Thus, the illustrated movement shown in FIGS. 3B and 3C can correspond to input 120 for diagonally panning the screen display 300C. In particular, the input 120 can correspond to a command to move the cell "B4" (corresponding to the fourth row in the column labeled "B") from the contact point 320 to the release point 322. This movement can be captured by a vector 324 that joins the contact point 320 to the release point 322. Capturing or calculation of the vector 324 can correspond to operation 206 of FIG. 2. Additionally, when the user's hand 316 is brought out of contact with the screen or display used to present the screen display 300C, the user device 102 can be configured to update the screen or display to present the view requested by the user. The calculation of the update in response to the determined or tracked vector 324 and/or input 120 is described above with reference to operations 208-210 of FIG. 2 and illustrated schematically immediately below with reference to FIG. 3D.

Figure 3D:
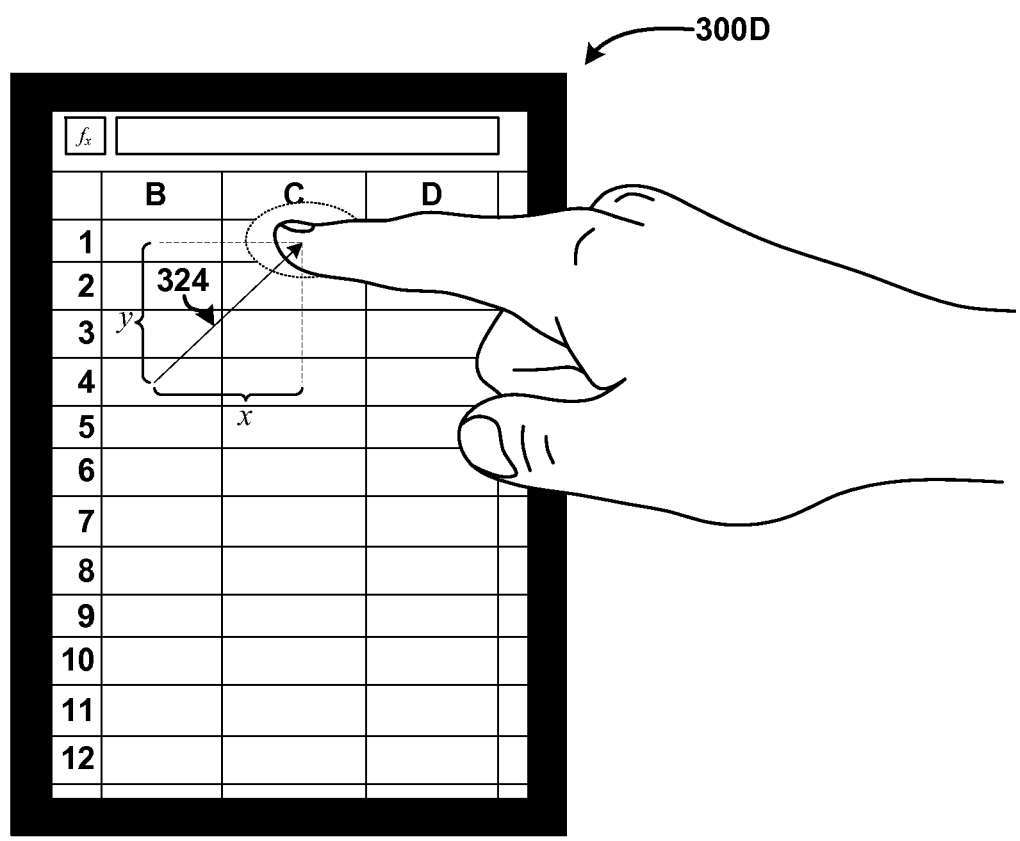

As shown in FIG. 3D, the user device 102 or other device configured to present the screen display 300B can be configured to execute UI scrolling manager 118 to capture the vector 324 and to determine how to update the displayed view based upon the vector 324. As shown in FIG. 3D, the vector 324 can include a horizontal or "x" component, labeled in FIG. 3D as x and a vertical or "y" component, labeled in FIG. 3D as y. Calculation of horizontal and vertical components of a vector 324 is generally understood and therefore will not be described in additional detail herein. It can be appreciated from the illustrated embodiment that the x component x can correspond to approximately one column of the displayed spreadsheet. It should be understood that the vector 324 is illustrative, and that the spreadsheet can be panned by exactly one column, by less than one column, and/or by more than one column.

Similarly, it can be appreciated from the illustrated embodiment that the y component y can correspond to approximately four rows of the displayed spreadsheet. It should be understood that the vector 324 is illustrative, and that in some embodiments the spreadsheet can be panned by portions of rows and need not panned by complete rows. In some other embodiments, the user device 102 is configured to pan the displayed spreadsheet in complete rows or columns, and as such, the vector 324 can interpreted as corresponding to complete rows or columns. Thus, for example, if a vector 324 corresponds to movement of 3.6 columns and 4.3 rows, the user device 102 can be configured to interpret that vector 324 as including an x component of four columns and a y component of 4 rows. It should be understood that these embodiments are illustrative, and should not be construed as being limiting in any way.

Figure 3E:
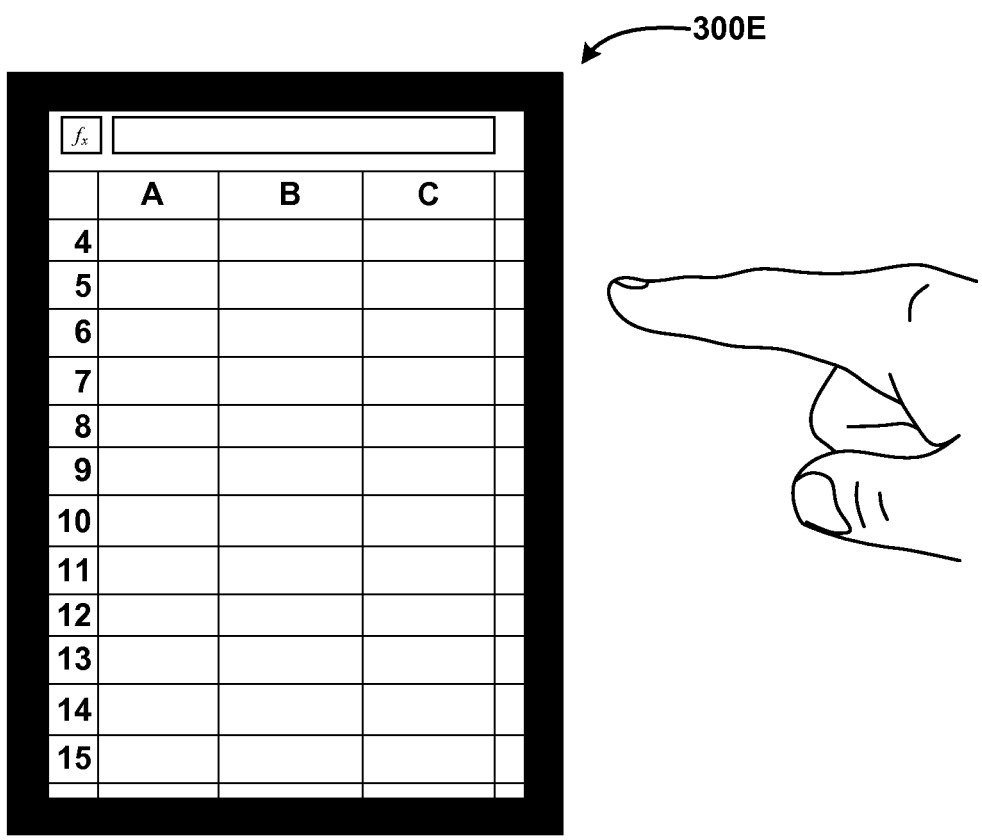

As explained above, the user device 102 can be configured to move a <div> tag of the columns an amount corresponding to the determined x component. Similarly, the user device 102 can be configured to move a <div> tag of the rows an amount corresponding to the determined y component. As such, the UIs 114 can be updated by modifying the underlying code such as HTML code or XML code, by implementing JAVA or other formats of scripts, and/or by implementing or executing other code or scripts. It should be understood that these embodiments are illustrative, and should not be construed as being limiting in any way. After implementing the input 120, the UIs 114 can be updated to reflect the new or modified view. An example of an updated screen display 300E after implementing the input 120 shown in FIGS. 3C-3D is illustrated in FIG. 3E. As such, it can be appreciated that using the concepts and technologies disclosed herein, a diagonal movement in a web-based spreadsheet application can be implemented by the user device 102 and applied to the UIs 114 to reflect the movement indicated by a input such as the input 120.

Figure 4:
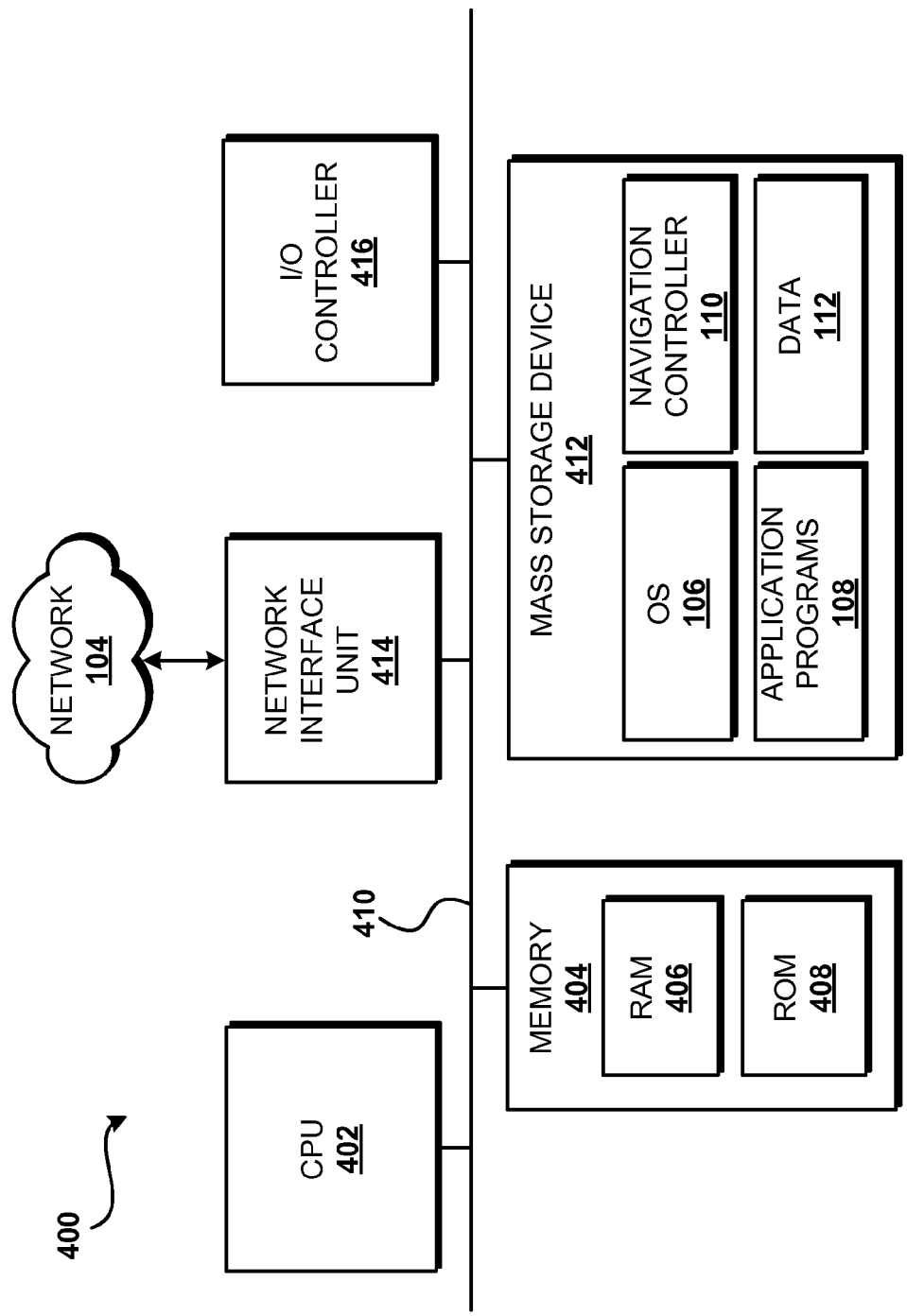
FIG. 4 is a computer architecture diagram illustrating an illustrative computer hardware and software architecture for a computing system capable of implementing aspects of the embodiments presented herein.

FIG. 4 illustrates an illustrative computer architecture 400 for a device capable of executing the software components described herein for row and column navigation. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 106 and one or more application programs including, but not limited to, the application programs 108 and the navigation controller 110. The mass storage device 412 also can be configured to store data such as, for example, the data 112. Although not shown in FIG. 4, the mass storage device 412 also can be configured to store the UIs 114, if desired.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 414 connected to the bus 410. It should be appreciated that the network interface unit 414 also may be utilized to connect to other types of networks and remote computer systems such as, for example, the server computer 124. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
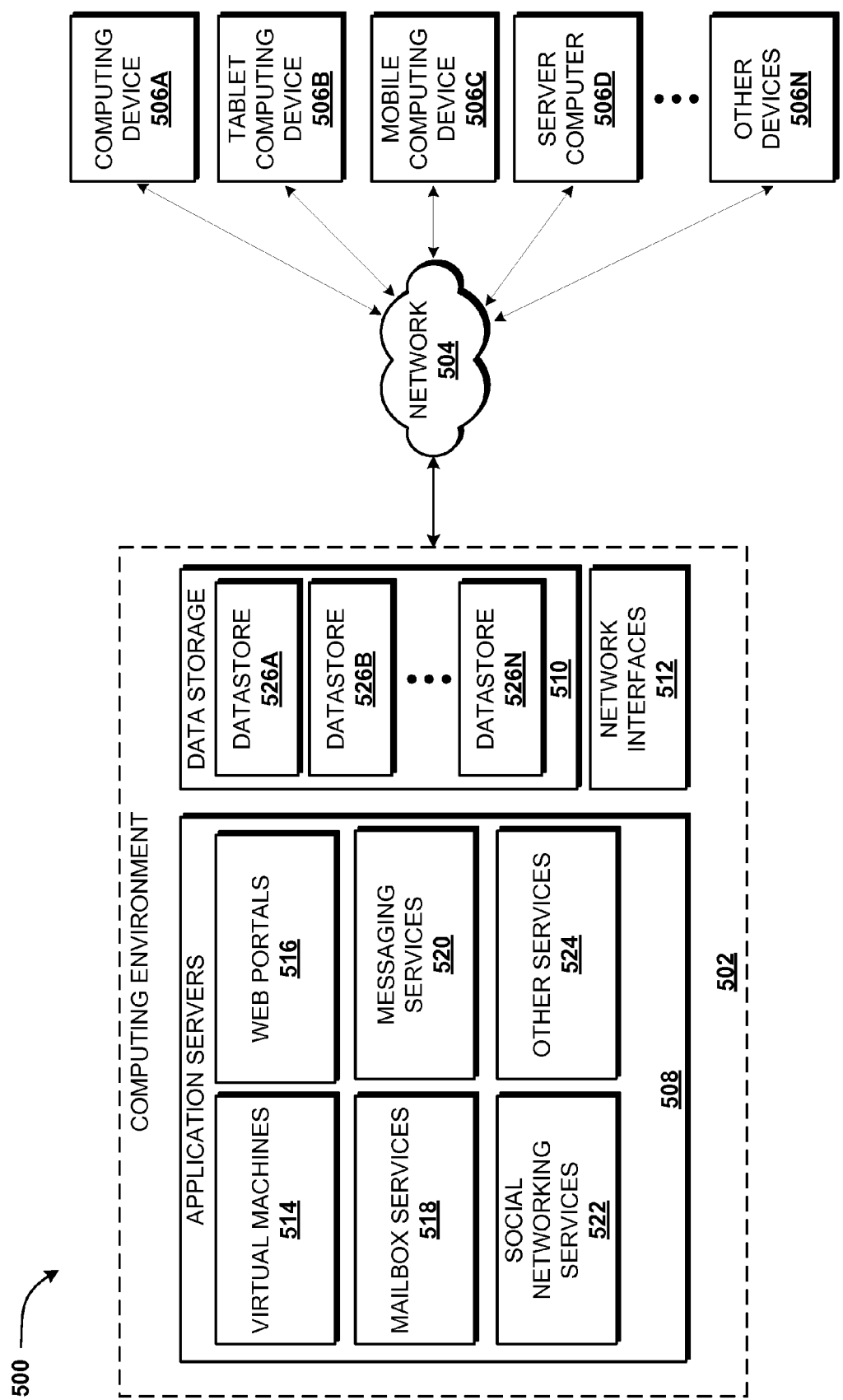
FIG. 5 is a diagram illustrating a distributed computing environment capable of implementing aspects of the embodiments presented herein.

FIG. 5 illustrates an illustrative distributed computing environment 500 capable of executing the software components described herein for row and column navigation. Thus, the distributed computing environment 500 illustrated in FIG. 5 can be used to provide the functionality described herein with respect to the user device 102 and/or the server computer 124. The distributed computing environment 500 thus may be utilized to execute any aspects of the software components presented herein.

According to various implementations, the distributed computing environment 500 includes a computing environment 502 operating on, in communication with, or as part of the network 504. The network 504 also can include various access networks. According to various implementations, the functionality of the network 504 is provided by the network 104 illustrated in FIG. 1. One or more client devices 506A-506N (hereinafter referred to collectively and/or generically as "clients 506") can communicate with the computing environment 502 via the network 504 and/or other connections (not illustrated in FIG. 5). In the illustrated embodiment, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. Two example computing architectures for the clients 506 are illustrated and described herein with reference to FIGS. 4 and 6. It should be understood that the illustrated clients 506 and computing architectures illustrated and described herein are illustrative, and should not be construed as being limited in any way.

In the illustrated embodiment, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated embodiment, the application servers 508 host one or more virtual machines 514 for hosting applications or other functionality. According to various implementations, the virtual machines 514 host one or more applications and/or software modules for providing the functionality described herein for row and column navigation. It should be understood that this embodiment is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also can include one or more social networking services 522. The social networking services 522 can include various social networking services including, but not limited to, services for sharing or posting status updates, instant messages, links, photos, videos, and/ or other information; services for commenting or displaying interest in articles, products, blogs, or other resources; and/or other services. In some embodiments, the social networking services 522 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 522 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/ or other services. It should be appreciated that the above lists of services are not exhaustive and that numerous additional and/or alternative social networking services 522 are not mentioned herein for the sake of brevity. As such, the above embodiments are illustrative, and should not be construed as being limited in any way.

As shown in FIG. 5, the application servers 508 also can host other services, applications, portals, and/or other resources ("other resources") 524. The other resources 524 can include, but are not limited to, the server application 126. It therefore can be appreciated that the computing environment 502 can provide integration of the concepts and technologies disclosed herein provided herein for row and column navigation with various mailbox, messaging, social networking, and/or other services or resources.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data. Although not illustrated in FIG. 5, the datastores 526 also can host or store the data 112, if desired.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 500 to utilize the functionality described herein for row and column navigation.

Figure 6:
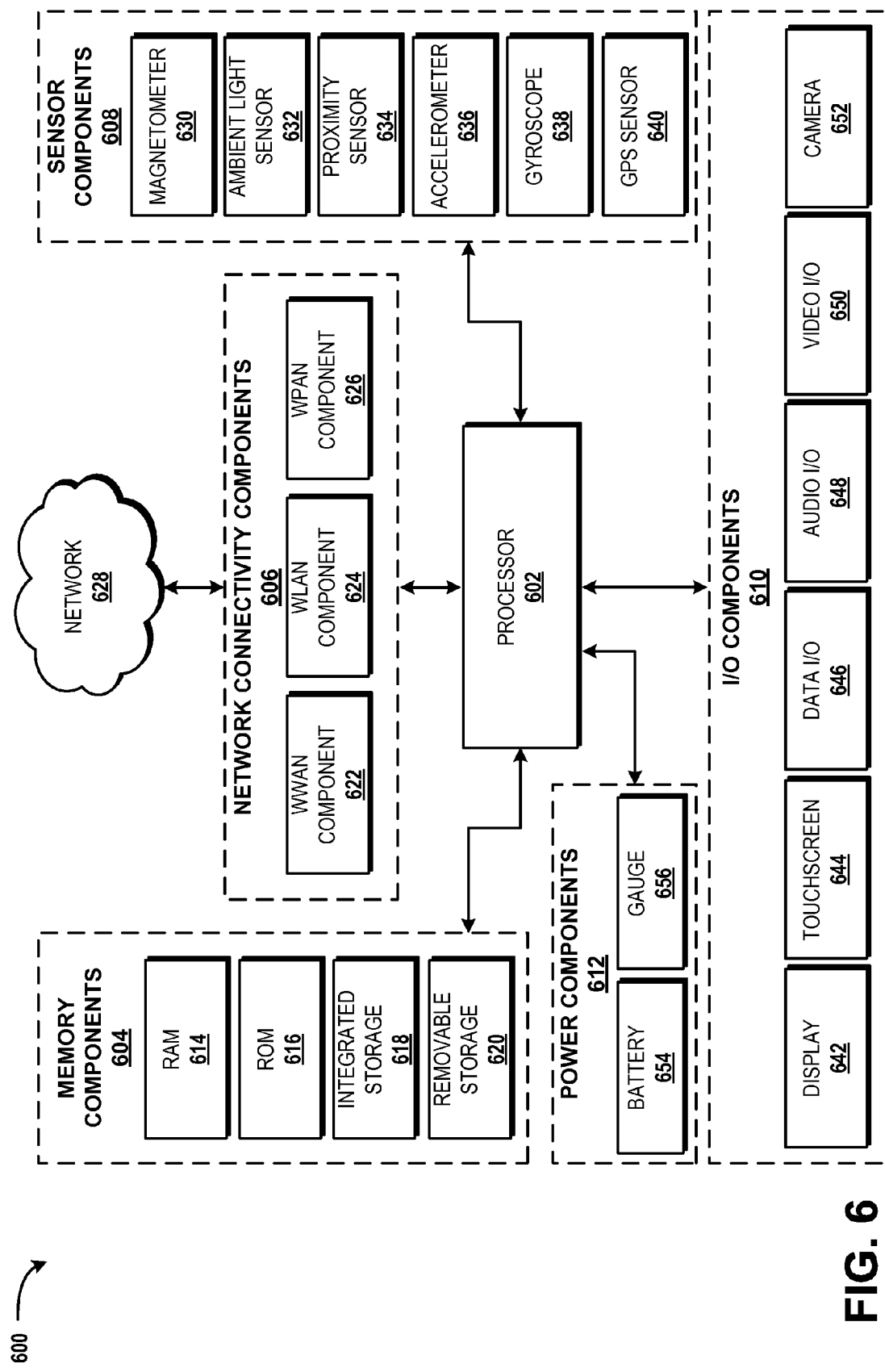
FIG. 6 is a computer architecture diagram illustrating a computing device architecture capable of implementing aspects of the embodiments presented herein.

Turning now to FIG. 6, an illustrative computing device architecture 600 for a computing device that is capable of executing various software components described herein for row and column navigation. The computing device architecture 600 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 600 is applicable to any of the clients 606 shown in FIG. 5. Furthermore, aspects of the computing device architecture 600 may be applicable to traditional desktop computers, portable computers (e.g., laptops, notebooks, ultra-portables, and netbooks), server computers, and other computer systems, such as described herein with reference to FIG. 4. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output components 610, and power components 612. In the illustrated embodiment, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some embodiments, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some embodiments, the processor 602 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some embodiments, the processor 602 is fabricated, in part, utilizing a package-on-package ("PoP") integrated circuit packaging technique. Moreover, the processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some embodiments, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some embodiments, the RAM 614 or a portion thereof, the ROM 616 or a portion thereof, and/or some combination the RAM 614 and the ROM 616 is integrated in the processor 602. In some embodiments, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some embodiments, the removable storage 620 is provided in lieu of the integrated storage 618. In other embodiments, the removable storage 620 is provided as additional optional storage. In some embodiments, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from a network 628, which may be a WWAN, a WLAN, or a WPAN. Although a single network 628 is illustrated, the network connectivity components 606 may facilitate simultaneous communication with multiple networks. For example, the network connectivity components 606 may facilitate simultaneous communications with multiple networks via one or more of a WWAN, a WLAN, or a WPAN.

In some embodiments, the functionality of the network 628 is provided by the network 104 and/or the network 504. In some other embodiments, the network 628 includes the network 104 and/or the network 504. In yet other embodiments, the network 628 provides access to the network 104 and/or the network 504.

The network 628 may be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("Wi-MAX"). Moreover, the network 628 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 628 may be configured to provide voice and/or data communications with any combination of the above technologies. The network 628 may be configured to or adapted to provide voice and/or data communications in accordance with future generation technologies.

In some embodiments, the WWAN component 622 is configured to provide dual-multi-mode connectivity to the network 628. For example, the WWAN component 622 may be configured to provide connectivity to the network 628, wherein the network 628 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 628 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 624 is configured to connect to the network 628 via the WI-FI access points. Such connections may be secured via various encryption technologies including, but not limited to, WI-FI Protected Access ("WPA"), WPA2, Wired Equivalent Privacy ("WEP"), and the like.

The network 628 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 626 is configured to facilitate communications with other devices, such as peripherals, computers, or other computing devices via the WPAN.

The sensor components 608 include a magnetometer 630, an ambient light sensor 632, a proximity sensor 634, an accelerometer 636, a gyroscope 638, and a Global Positioning System sensor ("GPS sensor") 640. It is contemplated that other sensors, such as, but not limited to, temperature sensors or shock detection sensors, also may be incorporated in the computing device architecture 600.

The magnetometer 630 is configured to measure the strength and direction of a magnetic field. In some embodiments the magnetometer 630 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 630 are contemplated.

The ambient light sensor 632 is configured to measure ambient light. In some embodiments, the ambient light sensor 632 provides measurements to an application program stored within one the memory components 604 in order to automatically adjust the brightness of a display (described below) to compensate for low-light and high-light environments. Other uses of measurements obtained by the ambient light sensor 632 are contemplated.

The proximity sensor 634 is configured to detect the presence of an object or thing in proximity to the computing device without direct contact. In some embodiments, the proximity sensor 634 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 634 are contemplated.

The accelerometer 636 is configured to measure proper acceleration. In some embodiments, output from the accelerometer 636 is used by an application program as an input mechanism to control some functionality of the application program. For example, the application program may be a video game in which a character, a portion thereof, or an object is moved or otherwise manipulated in response to input received via the accelerometer 636. In some embodiments, output from the accelerometer 636 is provided to an application program for use in switching between landscape and portrait modes, calculating coordinate acceleration, or detecting a fall. Other uses of the accelerometer 636 are contemplated.

The gyroscope 638 is configured to measure and maintain orientation. In some embodiments, output from the gyroscope 638 is used by an application program as an input mechanism to control some functionality of the application program. For example, the gyroscope 638 can be used for accurate recognition of movement within a 3D environment of a video game application or some other application. In some embodiments, an application program utilizes output from the gyroscope 638 and the accelerometer 636 to enhance control of some functionality of the application program. Other uses of the gyroscope 638 are contemplated.

The GPS sensor 640 is configured to receive signals from GPS satellites for use in calculating a location. The location calculated by the GPS sensor 640 may be used by any application program that requires or benefits from location information. For example, the location calculated by the GPS sensor 640 may be used with a navigation application program to provide directions from the location to a destination or directions from the destination to the location. Moreover, the GPS sensor 640 may be used to provide location information to an external location-based service, such as E911 service. The GPS sensor 640 may obtain location information generated via WI-FI, WIMAX, and/or cellular triangulation techniques utilizing one or more of the network connectivity components 606 to aid the GPS sensor 640 in obtaining a location fix. The GPS sensor 640 may also be used in Assisted GPS ("A-GPS") systems.

The I/O components 610 include a display 642, a touchscreen 644, a data I/O interface component ("data I/O") 646, an audio I/O interface component ("audio I/O") 648, a video I/O interface component ("video I/O") 650, and a camera 652. In some embodiments, the display 642 and the touchscreen 644 are combined. In some embodiments two or more of the data I/O component 646, the audio I/O component 648, and the video I/O component 650 are combined. The I/O components 610 may include discrete processors configured to support the various interface described below, or may include processing functionality built-in to the processor 602.

The display 642 is an output device configured to present information in a visual form. In particular, the display 642 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 642 is a liquid crystal display ("LCD") utilizing any active or passive matrix technology and any backlighting technology (if used). In some embodiments, the display 642 is an organic light emitting diode ("OLED") display. Other display types are contemplated.

The touchscreen 644 is an input device configured to detect the presence and location of a touch. The touchscreen 644 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 644 is incorporated on top of the display 642 as a transparent layer to enable a user to use one or more touches to interact with objects or other information presented on the display 642. In other embodiments, the touchscreen 644 is a touch pad incorporated on a surface of the computing device that does not include the display 642. For example, the computing device may have a touchscreen incorporated on top of the display 642 and a touch pad on a surface opposite the display 642.

In some embodiments, the touchscreen 644 is a single-touch touchscreen. In other embodiments, the touchscreen 644 is a multi-touch touchscreen. In some embodiments, the touchscreen 644 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 644. As such, a developer may create gestures that are specific to a particular application program.

In some embodiments, the touchscreen 644 supports a tap gesture in which a user taps the touchscreen 644 once on an item presented on the display 642. The tap gesture may be used for various reasons including, but not limited to, opening or launching whatever the user taps. In some embodiments, the touchscreen 644 supports a double tap gesture in which a user taps the touchscreen 644 twice on an item presented on the display 642. The double tap gesture may be used for various reasons including, but not limited to, zooming in or zooming out in stages. In some embodiments, the touchscreen 644 supports a tap and hold gesture in which a user taps the touchscreen 644 and maintains contact for at least a pre-defined time. The tap and hold gesture may be used for various reasons including, but not limited to, opening a context-specific menu.

In some embodiments, the touchscreen 644 supports a pan gesture in which a user places a finger on the touchscreen 644 and maintains contact with the touchscreen 644 while moving the finger on the touchscreen 644. The pan gesture is also referred to above with reference to FIGS. 1-3E as a tap-drag gesture. The pan gesture may be used for various reasons including, but not limited to, moving through screens, images, or menus at a controlled rate and/or indicating a command to pan or move the displayed data 112 in the UIs 114. Multiple finger pan gestures are also contemplated. In some embodiments, the touchscreen 644 supports a flick gesture in which a user swipes a finger in the direction the user wants the screen to move. The flick gesture may be used for various reasons including, but not limited to, scrolling horizontally or vertically through menus or pages. In some embodiments, the touchscreen 644 supports a pinch and stretch gesture in which a user makes a pinching motion with two fingers (e.g., thumb and forefinger) on the touchscreen 644 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 644. As such, the above gestures should be understood as being illustrative and should not be construed as being limiting in any way.

The data I/O interface component 646 is configured to facilitate input of data to the computing device and output of data from the computing device. In some embodiments, the data I/O interface component 646 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 648 is configured to provide audio input and/or output capabilities to the computing device. In some embodiments, the audio I/O interface component 646 includes a microphone configured to collect audio signals. In some embodiments, the audio I/O interface component 646 includes a headphone jack configured to provide connectivity for headphones or other external speakers. In some embodiments, the audio interface component 648 includes a speaker for the output of audio signals. In some embodiments, the audio I/O interface component 646 includes an optical audio cable out.

The video I/O interface component 650 is configured to provide video input and/or output capabilities to the computing device. In some embodiments, the video I/O interface component 650 includes a video connector configured to receive video as input from another device (e.g., a video media player such as a DVD or BLURAY player) or send video as output to another device (e.g., a monitor, a television, or some other external display). In some embodiments, the video I/O interface component 650 includes a High-Definition Multimedia Interface ("HDMI"), mini-HDMI, micro-HDMI, DisplayPort, or proprietary connector to input/output video content. In some embodiments, the video I/O interface component 650 or portions thereof is combined with the audio I/O interface component 648 or portions thereof.

The camera 652 can be configured to capture still images and/or video. The camera 652 may utilize a charge coupled device ("CCD") or a complementary metal oxide semiconductor ("CMOS") image sensor to capture images. In some embodiments, the camera 652 includes a flash to aid in taking pictures in low-light environments. Settings for the camera 652 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 654, which can be connected to a battery gauge 656. The batteries 654 may be rechargeable or disposable. Rechargeable battery types include, but are not limited to, lithium polymer, lithium ion, nickel cadmium, and nickel metal hydride. Each of the batteries 654 may be made of one or more cells.

The battery gauge 656 can be configured to measure battery parameters such as current, voltage, and temperature. In some embodiments, the battery gauge 656 is configured to measure the effect of a battery's discharge rate, temperature, age and other factors to predict remaining life within a certain percentage of error. In some embodiments, the battery gauge 656 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via a power I/O component 644.

Based on the foregoing, it should be appreciated that technologies for row and column navigation have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method comprising:
   obtaining data corresponding to web data for representing a spreadsheet having rows and columns;
   executing a web browser application program at a user device to display the obtained data in a user interface;
   detecting, at the user device, an input requesting a diagonal navigation command comprising simultaneous panning and scrolling of the rows and the columns;
   determining the requested diagonal navigation command of the input by way of a vector indicating a column component and a row component;
   determining reformatted data in a web browser compatible markup language in accordance with the requested diagonal navigation command by moving tags of the columns and the rows in the web browser compatible markup language by respective amounts corresponding to the column component and the row component indicated by the vector; and
   displaying the reformatted data on the user interface via the web browser application program.

2. The method of claim 1, wherein the input comprises a touch-drag gesture, and wherein detecting the input comprises executing a touch event handler configured to register the touch-drag gesture at the user device.

3. The method of claim 2, wherein the input comprises a touch-drag gesture, and wherein detecting the input further comprises determining that movement of the spreadsheet in a web browser has been detected subsequent to an initial contact associated with the touch-drag gesture.

4. The method of claim 1, wherein determining the requested diagonal navigation command by way of the vector comprises executing a user interface scrolling manager.

5. The method of claim 1, wherein determining the reformatted data in the web browser compatible markup language comprises:
  adjusting a div tag of a column header based upon the column component, and
  adjusting a div tag of a row header based upon the row component.

6. The method of claim 1, wherein the data is obtained from a server computer executing a web-based spreadsheet application.

7. The method of claim 1, wherein:
  the diagonal navigation command repositions at least a portion of the spreadsheet from a first position to a second position; and
  at least one of the first position or the second position relates to a viewable area of the user interface.

8. A computer storage medium having computer readable instructions stored thereupon that, when executed by a computer, cause the computer to perform acts comprising:
  obtaining data representing a spreadsheet having rows and columns, the data comprising data in a web browser compatible markup language;
  displaying the obtained data in a user interface of a web browser;
  detecting an input requesting a diagonal navigation movement of the spreadsheet, the requested diagonal navigation movement comprising simultaneous panning and scrolling of the rows and the columns of the spreadsheet;
  determining the requested diagonal movement of the input by way of a vector indicating a column component and a row component;
  moving tags of the columns and the rows in the web browser compatible markup language by respective amounts corresponding to the column component and the row component indicated by the vector to update the obtained data; and
  displaying the updated data in the user interface.

9. The computer storage medium of claim 8, wherein the input comprises a touch-drag gesture, and wherein detecting the input comprises executing a touch event handler to monitor an input device associated with the computer, the touch event handler being configured to register the touch-drag gesture at the input device.

10. The computer storage medium of claim 9, wherein the input comprises a touch-drag gesture, and wherein detecting the input further comprises determining that movement has been detected subsequent to an initial contact associated with the touch-drag gesture.

11. The computer storage medium of claim 10, wherein determining the requested diagonal navigation movement comprises:
  determining a column movement component of the vector, and
  determining a row movement component of the vector.

12. The computer storage medium of claim 11, wherein determining the requested diagonal navigation movement by way of the vector comprises determining a change in a horizontal distance component of the vector and determining a change in a vertical distance component of the vector.

13. The computer storage medium of claim 12, wherein displaying the updated data in the user interface comprises:
  adjusting a div tag of a column header included in the obtained data based, at least partially, upon the horizontal distance component of the vector, and
  adjusting a div tag of a row header included in the obtained data based, at least partially, upon the vertical distance component of the vector.

14. The computer storage medium of claim 8, wherein the data is obtained from a server computer executing a web-based spreadsheet application.

15. A system comprising:
  one or more processors; and
  at least one memory storing executable instructions that, when executed by the one or more processors, cause the one or more processors to perform operations comprising:
    receiving data in a web browser compatible markup language from a server computer, the data representing a spreadsheet having rows and columns;
    executing a web browser application to render a user interface for displaying the received data;
    detecting an input indicative of a diagonal navigation movement of the spreadsheet within the user interface;
    calculating a vector including a row movement component and a column movement component;
    moving tags of the columns and the rows in the web browser compatible markup language by respective amounts corresponding to the column movement component and the row movement component indicated by the vector via an execution of a script to update the received data; and
    displaying the updated data in the user interface.

16. The system of claim 15, wherein the operations further comprise:
  adjusting a div tag of a column header included in the received data based, at least partially, upon the column movement component of the vector; and
  adjusting a div tag of a row header included in the received data based, at least partially, upon the row movement component of the vector.

* * * * *